Patented Nov. 3, 1942

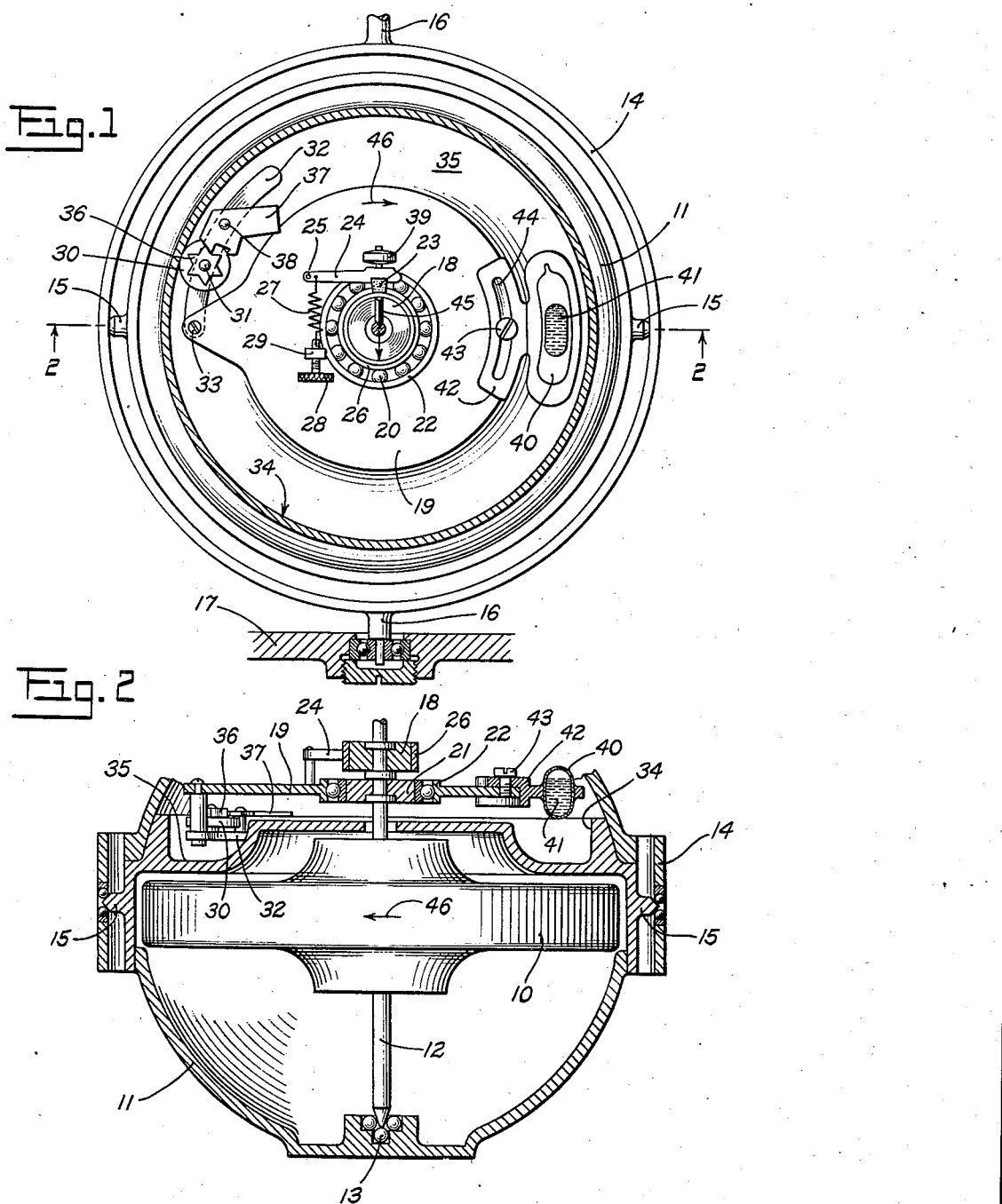

2,300,548

UNITED STATES PATENT OFFICE 2,300,548

ERECTING MEANS FOR GYROSCOPES

Hugh G. Hamilton, Montclair, N. J., assignor to Bendix Aviation Corporation, Bendix, N. J., a corporation of Delaware Application February 11, 1941, Serial No. 378,433

4 Claims. (Cl. 74—5)

This invention relates to gyroscopic devices of the type adapted for indicating the true vertical so as to provide an artificial horizon on mobile vehicles such, for example, as aircraft, and more particularly, to self-erecting means for such devices for maintaining the gyro spin axis vertical.

In prior art devices such, for example, as represented by the United States patent to Robert Alkan 2,159,118 issued May 23, 1939, provision was made for erecting gyro-verticals by the use of masses and/or balls rotating and/or rolling about the gyro spin axis. These structures, however, required the provision of circular tracks for guiding the masses and/or balls with the ensuing disadvantages that oftentimes binding of the former with the latter would result. Further, upon the accumulation of oil and dirt within the track, undue friction was imposed upon the masses and/or balls, whereby the accuracy of the erecting mechanism was impaired and the dependability of the gyro reduced.

An object of the present invention, therefore, is to provide a gyro vertical or artificial horizon with a novel erecting mechanism, whereby the foregoing disadvantages will be overcome.

Another object of the invention is to provide a gyro vertical or artificial horizon having novel means for rapidly damping the oscillations or precession of the gyroscope about its position of equilibrium.

A further object of the invention is to provide a novel gyro vertical or artificial horizon in which disturbances thereof due to accelerations produced by turning of the aircraft upon which the instrument is mounted or due to other accelerations are materially reduced.

Another object of the invention is to provide a gyro vertical or artificial horizon with a novel and improved erecting mechanism comprising a suitable container mounted for rotatable movement about the gyro spin axis, the container being provided with a globule of mercury and defining a path for limited linear movement of the mercury therein during a deviation of the gyro spin axis from its normal position whereby moments are developed upon the gyro suspension to return the spin axis to normal.

A still further object of the invention is to provide in a gyro vertical or artificial horizon, novel means for maintaining the gyro spin axis in a normally vertical position comprising a frame rotatable about the gyro spin axis, driving means operated by the gyro for rotating the frame about the spin axis at a speed substantially less than the speed of the gyro rotor, a container rotated by the frame about the gyro spin axis, a globule of mercury contained within the container for limited movement therein, and braking means connected to the frame and cooperating with a fixed part of the gyro assembly for variably braking the rotation of the frame to vary the speed thereof and of the container whereby the mercury therein moves from one end of the container to the other, the braking means including an escapement wheel and a non-isochronous anchor cooperating therewith to regulate the braking means and to produce a resisting couple to the rotation of the frame proportional to the speed of rotation of the container together with the mercury therein, the braking means being rendered effective by the container and the mercury upon deviation of the spin axis of the gyro rotor from the vertical to produce erecting forces upon the gyro suspension for returning the gyro spin axis back to the vertical position.

The above and other objects and advantages of the invention will appear more fully hereinafter from a consideration of the detailed description which follows, taken together with the accompanying drawing wherein one embodiment of the invention is illustrated. It is to be expressly understood, however, that the drawing is for the purpose of illustration and description only and is not designed as a definition of the limits of the invention, reference being had for the latter purpose to the appended claims.

In the drawing, wherein like reference characters refer to like parts in both views, Figure 1 is a top plan view of a gyro vertical embodying the present invention, with a top portion of the gyro casing removed, showing the novel erecting means of the invention; and, Figure 2 is a vertical section taken substantially along line 2—2 of Figure 1.

The gyro vertical embodying the invention comprises a gyroscope having a rotor mounted in a Cardan suspension for spinning about a normally vertical axis and for angular movement about two mutually perpendicular horizontal axes at right angles to the spin axis, the rotor being enclosed and journalled, in the present instance, in a casing carried in gimbals forming the Cardan suspension. The gyro rotor may be driven electrically or in any other suitable and desired manner known in the art.

The novel means for stabilizing the gyroscope and maintaining its spin axis vertical in order that the gyroscope may serve as a gyro vertical or artificial horizon, comprises a globule of mercury mounted for limited linear movement within an enclosed container which in turn is mounted for rotation about the gyro rotor spin axis. For this latter purpose there are provided means in the form of a frame or carriage mounted co-axially with the gyro spin axis cooperating with the mercury container to rotate the same about the gyro spin axis. It has been found that the use of the container with a globule of mercury instead of the previously used masses or balls increases the sensitivity of the erecting mechanism to a substantial degree.

Driving means having a slip driving connection to the gyro rotor are provided for driving the frame to rotate the mercury container carried thereby, together with braking means for retarding the rotation of the frame and mercury container to produce slipping action in the drive between the frame and the gyro rotor, thereby causing the rotation of the frame and mercury container at a speed substantially smaller than the speed of rotation of the gyro rotor. The braking means are in the form of an escapement device carried by the frame and cooperating with a wall of the gyro casing.

As long as the rotor axis remains in its normally vertical position, the frame rotates at a substantially constant speed which, as pointed out above, is considerably smaller than the speed of rotation of the gyro rotor. For example, the frame may rotate at a speed of only a few dozens of revolutions per minute, while the gyro rotor may have a speed of several thousand revolutions per minute.

As soon, however, as the gyro spin axis departs from its normally vertical position, due to friction, accelerations or other disturbing forces, the mercury container rotated with the frame cooperates with the braking means to cause the latter to produce a variable retarding action on the frame, and, therefore, on the mercury container, whereby erecting forces are developed which return the gyro spin axis back to vertical at which time the frame and container are again brought back to a constant speed.

Referring now to Figures 1 and 2 of the drawing for a more detailed description, the present invention is shown as comprising a gyroscope including a rotor 10 mounted within a casing 11 for spinning about a normally vertical axis. The rotor 10 has a shaft 12 secured thereto or formed integrally therewith, one end of shaft 12 being journalled in a bearing 13 at the bottom of the casing 11 while the upper end of the shaft is journalled in a similar bearing (not shown) in the upper part of the casing.

The casing 11, in turn, is mounted in a Cardan suspension comprising a gimbal ring 14 in which the casing 11 is pivoted for angular movement about a horizontal axis formed by the trunnions 15, 15, the gimbal ring 14, in turn, being pivoted for angular movement about a second horizontal axis perpendicular to the first formed by trunnions 16, 16 which are journalled in a fixed support 17.

A driving drum 18 is mounted upon the upper portion of shaft 12 to rotate therewith co-axially with the rotor 10 in a manner similar to that disclosed in the aforementioned patent to Robert Alkan, 2,159,118. Mounted co-axially with the driving drum 18 for rotation about the rotor spin axis is a frame 19 which is journalled on the upper end of the shaft 12 beneath the drum 18 by ball bearings 20 seated in an inner ball race 21 rigidly secured to the upper portion of shaft 12 and an outer ball race 22 formed integrally with the frame 19.

A slip drive is provided for rotating the frame 19 about shaft 12 at a speed substantially smaller than the speed of shaft 12 and its rotor 10. The slip drive comprises a friction member or shoe 23 carried by an arm 24 pivoted at 25 on the frame 19. The friction shoe 23 cooperates with a friction band or collar 26 secured to the periphery of the drum 18, and the shoe 23 is urged into frictional driving engagement with the collar 26 by arm 24 with the aid of a spring 27 having one end thereof connected to arm 24 adjacent the pivot 25 and the other end connected to an adjustable screw 28 threaded in a post 29 carried by the frame 19. Pressure of shoe 23 upon collar 26 is determined by tensioning of spring 27 by adjustment of screw 28. By virtue of the connection of arm 24 with frame 19 together with the frictional engagement of shoe 23 with the friction collar 26 on the driving drum 18, the frame 19 is rotated by drum 18 about shaft 12 and the gyro rotor spin axis in view of the ball bearing connection 20, 21, 22.

The speed of rotation of frame 19 must be substantially smaller than that of the rotor and likewise substantially independent of any variations in the rotor speed. Braking and regulating means are provided for this purpose and constitute a roller 30 journalled by means of a shaft 31 in an arm 32 pivoted and secured to frame 19 at 33. Roller 30 engages the wall 34 of a drum 35 forming part of the casing 11 to roll therealong when in engagement therewith while frame 19 is rotated. Secured to or formed integrally with the shaft 31 of roller 30 to rotate therewith is an escapement starwheel 36 which cooperates with a forked anchor 37 pivoted at 38 on the arm 32. This structure provides an escapement device having a non-isochronous return, the frequency or period of oscillation of the anchor 37 depending on the speed of rotation of roller 30 and starwheel 36 to thus provide a small retarding force on roller 30 during relatively small speeds and a greater retarding force during increased speed to maintain the frame rotation at a substantially constant speed.

The pivotal axis 38 of anchor 37 is arranged parallel to the gyro rotor spin axis and it is advantageous to locate the center of gravity of the anchor 37 away from its pivotal axis 38 to thereby form a block oriented in azimuth in such a manner that the period or frequency of oscillation of the anchor, and, therefore, the speed of rotation of the frame 19 shall be affected not only by variations in the driving torque due to increased speed of rotation of rotor 10 and shaft 12 but also by acceleration forces inpressed upon the anchor.

Also forming a part of the above braking and regulating mechanism is a centrifugal weight 39 secured to the movable end of pivoted arm 24 at the point where friction shoe 23 is likewise attached.

In accordance with the novel feature of the present invention, there is provided a sealed container or capsule 40 having a globule of mercury 41 therein which act together to render the system operative and effective to produce erecting forces for returning the gyro spin axis to vertical in the event the spin axis departs from vertical for any reason. The capsule 40 together with the mercury 41 comprise a relatively heavy weight. Capsule 40 is adjustably secured to the frame 19 by means of a bracket 42 and set screw 43 which passes through the slot 44 of the bracket and secures the latter and the capsule for rotation with frame 19.

In operation, when the gyro rotor 10 is rotated with its shaft 12, the driving drum 18 carried by the shaft drives the frame 19 through friction members 23 and 26, thereby rotating the frame about the shaft 12 together with weight 39, capsule 40 and mercury 41, and roller 30. Rotation of roller 30 along wall 34 is regulated and limited by the action of anchor 37 which in turn depends upon the speed of rotation of frame 19.

Should the speed of rotation of the frame 19 increase due to either an increase in the speed of rotation of rotor 10 or due to other causes, the rotation of roller 30 along wall 34 is braked due to the increased frequency of oscillation of the anchor 37 upon the starwheel 36, thereby retarding the rotation of frame 19 and capsule 40, the latter of which, together with the mercury, comprises the relatively heavy weight. At the same time, centrifugal forces developed due to rotation of frame 19 act on weight 39 to reduce the pressure of friction shoe 23 on collar 26 of driving drum 18, thereby reducing the driving couple upon the rotating frame 19.

With a decrease in the speed of rotation of the frame 19, the anchor 37 oscillates less frequently because the speed of rotation of roller 30 is decreased thereby reducing the braking action produced by anchor 37 upon roller 30 and the centrifugal forces acting upon weight 39 being decreased permit an increase in friction between friction shoe 23 and drum 18 thus increasing driving action on the frame 19. As a result, frame 19 and capsule 40 tend to take up a speed of rotation such that the braking action exerted by anchor 37 and the increased driving action of brake shoe 23 and friction band 26 balance each other, thereby bringing about a constant speed of rotation of the frame 19 and capsule 40, which is entirely independent of the gyro rotor speed and which can be brought down to a few dozens of revolutions per minute even though the rotor 10 and driving drum 18 rotate at several thousand revolutions per minute.

Assuming now that an acceleration force acts in the direction of the central arrow 45 shown in Figure 1 and in the plane of the paper causing a departure of the rotor spin axis from the normally vertical position, and the gyro rotor together with frame 19 and capsule 40 are rotating clockwise as indicated by arrow 46, the action of the acceleration force exerted on the capsule 40 will tend to increase its speed of rotation at the instant the capsule is in the position shown in Figure 1 and at the same time will tend to urge the mercury to roll against the rounded or leading end of the capsule thereby tending to cause a further increase in the speed of rotation of the capsule until the moment that the capsule 40 reaches a position diametrically opposite to that shown in Figure 1, at which time the mercury rolls from the leading end to the trailing end of the capsule thereby providing a momentary stopping of the frame rotation. Due to this momentary stopping of the capsule and mercury in the position diametrically opposite to that shown in Figure 1, moments are developed by the mercury capsule due to gravitational pull thereon in the direction toward the plane of the paper and about the trunnions 16, 16 thereby causing the spin axis of the rotor to precess about the trunnions 15, 15 back to its normally vertical position.

Since the speed of rotation of the frame 19 and the capsule 40 together with the mercury therein is entirely independent of any variations in gyro rotor speed and, therefore, substantially constant when the gyro rotor spin axis is in a true vertical position, the only variation in the speed of rotation of frame 19 and capsule 40 together with its mercury is that caused by accelerations acting on the mercury capsule and that due to deviation of the spin axis from the true vertical. For this reason, even a small acceleration is sufficient to make the time during which the mercury capsule travels around one half of the circumference to materially differ from the time required for it to travel around the other half of the circumference. Such a variation manifests itself by a tendency of the gyro to erect its spin axis in the direction of the acceleration and by a direct linear precessional movement and not by a spiral precessional movement.

An acceleration component acting in the direction of the arrow 45, shown in Figure 1, also manifests itself by acting on the friction shoe 23 to increase the driving torque of drum 18 on the frame 19 and the mercury capsule, thereby increasing the rotational speed of the mercury capsule during the downward half turn, as seen in Figure 1, and during the upward half turn the acceleration force acts on the brake shoe 23 and the mercury capsule in the reverse direction so as to urge brake shoe 23 away from the brake lining to decrease the frictional engagement therebetween with a consequent slowing down of the mercury capsule.

By adjusting the position of the mercury capsule 40 by set screw 43 it is possible to regulate, as desired, the phase of the variations of the speed of capsule 40 in relation to the angular position thereof.

Freedom of motion of the liquid within the capsule 40 is at all times highly desirable, and this is accomplished by choice of suitable liquid, which in the present instance has been described as mercury 41, but it is to be understood that other liquid may be used as well. Likewise, the capsule may be formed of glass or other suitable material having its surface properly prepared so as to eliminate the presence of any contaminating substances.

The foregoing operation of the erecting mechanism has been described only in connection with acceleration forces acting to disturb the rotor spin axis. However, tilting of the rotor spin axis due to bearing friction or causes other than acceleration forces results in the same operation of the erecting mechanism with the exception that in place of the acceleration forces, a gravitational pull is exerted upon capsule 40 to speed up its movement over one-half of the circumference of wall 34, depending upon the direction of tilt, and to slow up the capsule during its upward movement. At the time that upward movement begins momentary stopping of capsule 40 and the mercury ball, due to the gravitational pull which is in the opposite direction at this point, results to create moments about either axis 15 or 16, again depending upon the direction of tilt, to cause the rotor to precess into its normally vertical position.

From the foregoing, it will be apparent to those skilled in the art that a novel gyro-vertical has been provided having novel erecting means for maintaining the gyro spin axis in a true vertical position at all times without the use of reaction air jets and/or pendulums, and by reason of the improved and novel erecting means the erecting system is not disturbed when the gyro-vertical is used on aircraft during violent maneuvers but continues to perform its function properly and efficiently at all times.

Although but one embodiment of the invention has been illustrated and described, various changes and modifications in the form and relative arrangement of parts, which will now appear to those skilled in the art, may be made without departing from the scope of the invention. Reference is therefore to be had to the appended claims for a definition of the limits of the invention.

What is claimed is:

1. In a gyro vertical, the combination of a gyroscope comprising a rotor mounted for spinning about a normally vertical axis, a casing mounting said rotor for angular movement about two mutually perpendicular horizontal axes at right angles to the spin axis, a rotatable frame, means mounting said frame for rotation about the spin axis of said rotor, means drivably connecting said frame with said rotor whereby said frame is rotated at a speed substantially less than the speed of said rotor, regulating means comprising braking means carried by said frame and in engagement with said casing for maintaining the speed of frame rotation substantially constant while the spin axis of said rotor is in its normally vertical position and adapted to vary the speed of frame rotation when the spin axis of said rotor deviates from said vertical position, a hollow container mounted on said frame for rotation therewith about said spin axis, and a mass located within said container having freedom of movement therein so as to be relatively displaced within said container upon deviation of said spin axis to actuate the regulating means to vary the speed of rotation of said frame whereby erecting forces are developed on the gyroscope to return said rotor spin axis to its normally vertical position.

2. In a gyro vertical, the combination of a gyroscope comprising a rotor mounted for spinning about a normally vertical axis, a casing mounting said rotor for angular movement about two mutually perpendicular horizontal axes at right angles to the spin axis, a rotatable frame, means mounting said frame for rotation about the spin axis of said rotor, means drivably connecting said frame with said rotor whereby said frame is rotated at a speed substantially less than the speed of said rotor, regulating means comprising an escapement mechanism carried by said frame and in engagement with said casing for maintaining the speed of frame rotation substantially constant while the spin axis of said rotor is in its normally vertical position and adapted to vary the speed of frame rotation when the spin axis of said rotor deviates from said vertical position, a sealed hollow container mounted on said frame for rotation therewith about said spin axis, and a fluid mass located within said container and having freedom of movement therein so as to be relatively displaced within said container upon deviation of said spin axis to actuate the regulating means to vary the speed of rotation of said frame whereby erecting forces are developed on the gyroscope to return said rotor spin axis to its normally vertical position.

3. In a gyro vertical, the combination of a gyroscope comprising a rotor mounted for spinning about a normally vertical axis, a casing mounting said rotor for angular movement about two mutually perpendicular horizontal axes at right angles to the spin axis, a rotatable frame, means mounting said frame for rotation about an axis co-axial with said rotor spin axis, means drivably connecting said frame with said rotor whereby said frame is rotated at a speed substantially less than the speed of said rotor, regulating means connected to said frame for maintaining the speed of frame rotation substantially constant while the spin axis of said rotor is in its normally vertical position and adapted to vary the speed of frame rotation when the spin axis of said rotor deviates from said vertical position, a capsule mounted on said frame and rotatable therewith about said spin axis, and a globule of mercury located within said capsule for rolling movement therein so as to be relatively displaced within said capsule upon deviation of said spin axis to actuate the regulating means to vary the speed of rotation of said frame whereby erecting forces are developed on the gyroscope to return said rotor spin axis to its normally vertical position.

4. In a gyro vertical, the combination of a gyroscope comprising a rotor mounted for spinning about a normally vertical axis, a casing mounting said rotor for angular movement about two mutually perpendicular horizontal axes at right angles to the spin axis, a substantially circular rotatable frame, means mounting said frame for rotation about the spin axis of said rotor, a slip-connection from said rotor to said frame for rotating said frame at a speed substantially less than the speed of said rotor, regulating means connected to said frame for maintaining the speed of frame rotation substantially constant while the spin axis of said rotor is in its normally vertical position and adapted to vary the speed of frame rotation when the spin axis of said rotor deviates from said vertical position, a capsule secured to the outer periphery of said frame for rotation therewith about said spin axis, and a globule of mercury disposed within said capsule for rolling movement therein so as to be relatively displaced within said capsule upon deviation of said spin axis to actuate the regulating means to vary the speed of rotation of said frame whereby erecting forces are developed on the gyroscope to return said rotor spin axis to its normally vertical position.

HUGH G. HAMILTON.